United States Patent [19]
Schuurman

[11] Patent Number: 5,874,818
[45] Date of Patent: Feb. 23, 1999

[54] METHOD AND APPARATUS FOR SENSING LOAD CURRENT IN A MOTOR CONTROLLER

[75] Inventor: Derek C. Schuurman, Drayton, Canada

[73] Assignee: Agile Systems, Inc., Waterloo, Canada

[21] Appl. No.: 873,158

[22] Filed: Jun. 11, 1997

[51] Int. Cl.[6] .................................................. H01R 39/46
[52] U.S. Cl. .......................... 318/439; 318/254; 318/138; 318/599; 318/280; 363/17; 363/18
[58] Field of Search ..................... 318/254, 439, 318/138, 599, 280; 363/17, 98

[56] References Cited

U.S. PATENT DOCUMENTS

| | | | |
|---|---|---|---|
| 4,980,838 | 12/1990 | Daggett et al. | 318/599 X |
| 5,343,382 | 8/1994 | Hale et al. | 318/599 |
| 5,639,970 | 6/1997 | Schulz | 363/17 |
| 5,689,162 | 11/1997 | Li | 318/599 |

OTHER PUBLICATIONS

Konopoka and Twitchell, "Higher Voltage Servo Redesign Requires Current Sensing Re–Evaluation", *Power Conversion and Intelligent Motion*, Feb. 1997, pp. 12–19.

Unitrode Integrated Circuits Corporation, *Products and Applications Handbook*, 1995–1996, pp. 10–97 to 10–101 (UC3620), 10–150 to 10–156 (UC3625), and 10–247 to 10–259 (UC3625).

*Primary Examiner*—Karen Masih
*Attorney, Agent, or Firm*—Alex Porat; Blake, Cassels & Graydon

[57] ABSTRACT

The approach to measuring load current in a multi-phase bridge inverter circuit connected to a multiphase load involves placing a single current sense resistor in series with the inverter circuit and power supply. The current flow through the sense resistor is sampled during a portion of the switching cycle wherein the inverter is configured to enable current flowing through the multi-phase load to flow through the sense resistor. Typically, this will occur during a portion of the switching cycle (e.g. PWM cycle) wherein the load is being actively driven. For a 120°, 3-phase, 6-step commutation sequence typically used to control a d.c. brushless servo motor, the sampled current is a time-multiplexed measure of the current flow through each load phase. The same sense resistor is also used for indicating a short circuit condition by comparing the voltage across the resistor to a reference voltage.

22 Claims, 7 Drawing Sheets

| Step | Voltage Direction | Phase A output | Phase B output | Phase C output |
|---|---|---|---|---|
| Step I | Forward | Hi | Lo | Z |
| Step II | Forward | Hi | Z | Lo |
| Step III | Forward | Z | Hi | Lo |
| Step IV | Forward | Lo | Hi | Z |
| Step V | Forward | Lo | Z | Hi |
| Step VI | Forward | Z | Lo | Hi |
| Step I | Reverse | Lo | Hi | Z |
| Step II | Reverse | Lo | Z | Hi |
| Step III | Reverse | Z | Lo | Hi |
| Step IV | Reverse | Hi | Lo | Z |
| Step V | Reverse | Hi | Z | Lo |
| Step VI | Reverse | Z | Hi | Lo |

Hi = $V_{Hi}$ and $V_{Lo}$ PWM signals active on bridge leg

Lo = Low side switch is on for unipolar scheme or opposite PWM signals applied on bridge leg for bipolar scheme Z = High impedance output - power switches in leg are both off

Fig. 3

METHOD AND APPARATUS FOR SENSING LOAD CURRENT IN A MOTOR CONTROLLER

FIELD OF INVENTION

The invention generally relates to the field of power electronics and to an apparatus and method for measuring current flow in a multi-phase load. More specifically, the invention relates to an apparatus and method for sensing load current in a motor controller which may employ a multi-phase bridge inverter circuit for switching the applied motor voltage.

BACKGROUND OF INVENTION

Conventional motor control systems typically require a method of measuring or sensing the current supplied to or flowing in a motor. This is because current control typically forms the "inner loop" of the motor control system, e.g., the value of the motor current is used to regulate the duty cycle of the applied voltage. In addition, current sensing is also important as a first step in determining whether a short circuit has occurred and can thus provide a means to protect the electronic power switches used in the motor control system. Determining a suitable current sensing approach is a vital step in the design of motor controls.

Typically, a servo control topology will employ a power switching matrix, such as an inverter circuit, for routing power from a d.c. voltage source to a three phase motor. One typical inverter circuit, the well known three phase bridge, consists of three parallel legs, each leg having two power switches, with a phase output being available on each leg at a point between the two power switches thereof. Commutation, i.e. control of the inverter, can be can be provided, for example, by a 120° mode, 6-step, 3 phase commutation controller which causes the inverter to supply a pulse width modulated ("PWM") voltage signal to sequentially drive each phase of the motor. The pulse width modulation provides a switching cycle having a time period wherein the motor is actively driven, and a time period wherein the motor is freewheeling. The PWM duty cycle determines the average voltage applied to the motor.

The physical devices available for sensing motor load current include simple resistive shunts, current transformers, optical isolation amplifiers, and open and closed loop Hall effect transducers. One article, by Konopoka and Twitchell, entitled "Higher Voltage Servo Redesign Requires Current Sensing Re-Evaluation", *Power Conversion and Intelligent Motion*, February 1997, pp. 12–19, discusses the various electrical requirements that should be taken into account in selecting current and ground fault sensors for a three phase brushless servo motor controller such as described above. These requirements include isolation, linearity, zero offset, response time, bandwidth, temperature rating, hysteresis, noise immunity and insertion loss. As is typical of the prior art, the use of a resistive shunt was quickly ruled out as a current sensing option since it was assumed that a resistor would have to be serially connected to each phase of the motor and the relatively high voltage differential between each of the three phases would pose isolation problems. Instead, a closed loop Hall effect transducer was chosen as the best option because, among other criteria, it provides good isolation characteristics and the fastest response time of all the remaining current sensing devices.

Such a solution, although effective, can be relatively expensive due to the need for at least two closed loop Hall effect transducers. Other sensing options have various limitations to them such as inability to measure d.c. currents, poor accuracy, poor bandwidth, and poor response times. Despite these drawbacks, the resistive shunt, which can offer excellent performance in many of the foregoing design criteria at a very low cost, is often overlooked.

The present invention provides an approach to sensing motor current, or current flow through other types of multi-phase loads, by employing a single resistive shunt in a unique and relatively inexpensive manner which overcomes the perceived limitations of the prior art.

SUMMARY OF THE INVENTION

Broadly speaking, the invention utilizes a single current sense resistor which is disposed in series between a switching matrix, to which a multi-phase load is connected, and a power supply. The current flow through the sense resistor is sampled during a portion of a switching cycle of the power switching matrix wherein the matrix is configured to enable current flowing through the multi-phase load to flow through the sense resistor. Typically, this will occur during a portion of the switching cycle (e.g. PWM cycle) wherein the load is being actively driven. Depending on the particulars of the commutation sequence, the sampled current is either a time-multiplexed measure of the current through each phase of the load (hereinafter "phase current") or a time-multiplexed measure of an aggregation of phase currents (hereinafter "load current"). In the latter case, the phase current for a particular load phase during any given commutation step can be easily computed since it is typically related to the load current by a mathematical relationship which, again, depend on the particulars of the commutation controller.

The same current sense resistor is also used for indicating a short circuit condition by comparing the voltage across the resistor to a reference voltage.

According to one aspect of the invention, an apparatus is provided for sensing the current supplied to a multi-phase load. The apparatus can be used in a power controller, such as one which powers a multi-phase load from a power supply by employing (a) a power switching matrix connected to the load and (b) switching control means connected to the matrix for generating a switching cycle and a commutation sequence therefor. The apparatus, in combination with the switching control means, includes a current sense resistor connected in series between the power supply and the power switching matrix such that the power supply, switching matrix and sense resistor form an electrical loop. A sampling circuit samples the current flow through the sense resistor. The sampling circuit has a control input for the selective activation thereof and an output which provides a signal representative of the sampled current. A synchronizing circuit, operatively connected to the control input of the sampling circuit, activates the sampling circuit for a time period corresponding to a portion of the switching cycle in each commutation step wherein the power switching matrix is configured to enable current flowing through the load to flow through the sense resistor.

In the preferred embodiment, the switching control means includes a commutation controller that implements either a unipolar switching scheme or a bipolar switching scheme, both of which use pulse width modulated ("PWM") signals for the switching control signals. In either case, the sampling period is a portion of the PWM cycle wherein the power switching matrix actively drives the load.

The sampling circuit preferably includes (a) a capacitor connected in parallel with the sense resistor, and (b) a sampling switch which is installed between the capacitor and sense resistor in order to selectively charge the capacitor. The capacitor and sampling switch are preferably selected such that $$T_{H_{min}} \approx C_s * R_{S_s\text{-}ON}$$

where $T_{H_{min}}$ is a minimum permissible period for the portion of the switching cycle wherein the load is actively driven, $C_S$ is the capacitance provided by the capacitor, and $R_{Ss\text{-}ON}$ is the on-resistance of the switch.

According to another aspect of the invention, a multi-phase motor controller is provided. The motor controller includes a power switching matrix for selectively powering a multi-phase motor from a power supply. Switching control circuitry, including a commutation controller or decoder, is connected to the power switching matrix for controlling the switching cycle thereof and providing an m-phase, n-step commutation sequence. A sense resistor is connected in series between the power supply and the power switching matrix such that the power supply, switching matrix and sense resistor form an electrical loop. A sampling circuit is provided for sampling the current flow through the sense resistor. A synchronizing circuit is connected to the sampling circuit and is responsible for activating the sampling circuit to correspond to portions of the switching cycle in each commutation step wherein the power switching matrix is configured to actively drive the motor.

BRIEF DESCRIPTION OF THE DRAWINGS

The present invention may be better understood by considering the following detailed description, taken in conjunction with the following drawings, in which:

FIG. 3 is a commutation chart illustrating the logic embodied by a portion of the switch control circuitry (shown in FIG. 2) in order to produce a 120°, 3-phase, 6-step commutation sequence for the power switching matrix;

DETAILED DESCRIPTION OF PREFERRED EMBODIMENTS

Figure 1:
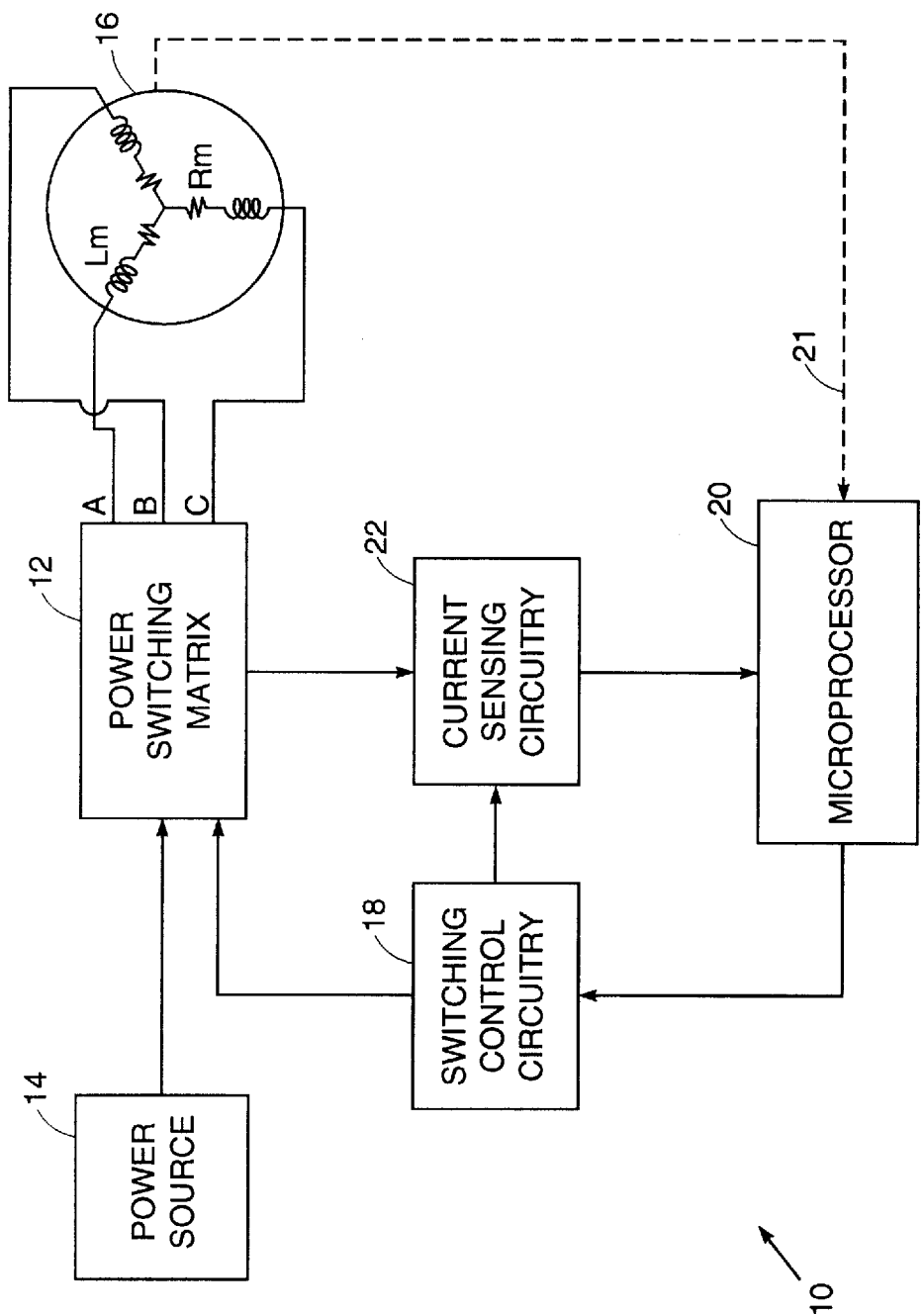
FIG. 1 is a schematic block diagram of a motor drive controller, in accordance with the preferred embodiment.

FIG. 1 shows, in block diagram form, a motor drive controller 10 in accordance with the preferred embodiment. The controller 10 comprises a power switching matrix 12 which is used to route power obtained from a d.c. power source 14 to a three phase motor 16 having phase inputs A, B and C (or phase outputs A, B, and C as viewed from the perspective of the matrix). The term "motor drive controller" will be understood to include conditions where the motor is used as a generator, wherein power flow is reversed.

The power switching matrix 12 is controlled by switch control circuitry 18 (which includes a commutation controller or decoder, as described in greater detail below) in order to provide a pulse width modulated ("PWM") control signal to each switch in the matrix 12. A microprocessor 20 commands the switch control circuitry 18 in order to set the PWM switching frequency and the PWM duty cycle, and hence the average voltage applied to the motor. The microprocessor 20 may receive feedback from the motor via a line 21. The feedback may be used by various servo control loops running on the microprocessor, such as velocity or position control loops. Such feedback may include, for example, data from Hall effect sensors mounted in the motor or data from rotary encoders mounted on the motor shaft. Alternatively, motor 16 may be operated in an open control loop without any (non-current) feedback. The control loop strategy is not particularly important to the invention, provided that the control strategy somehow require information relating to motor phase current or motor load current.

The power switching matrix 12 is uniquely coupled to current sensing circuitry 22 which is used to measure the motor load current. As described in greater detail below, the current sensing circuitry 22 employs a switch which is also controlled by the switch control circuitry 18.

Figure 2:
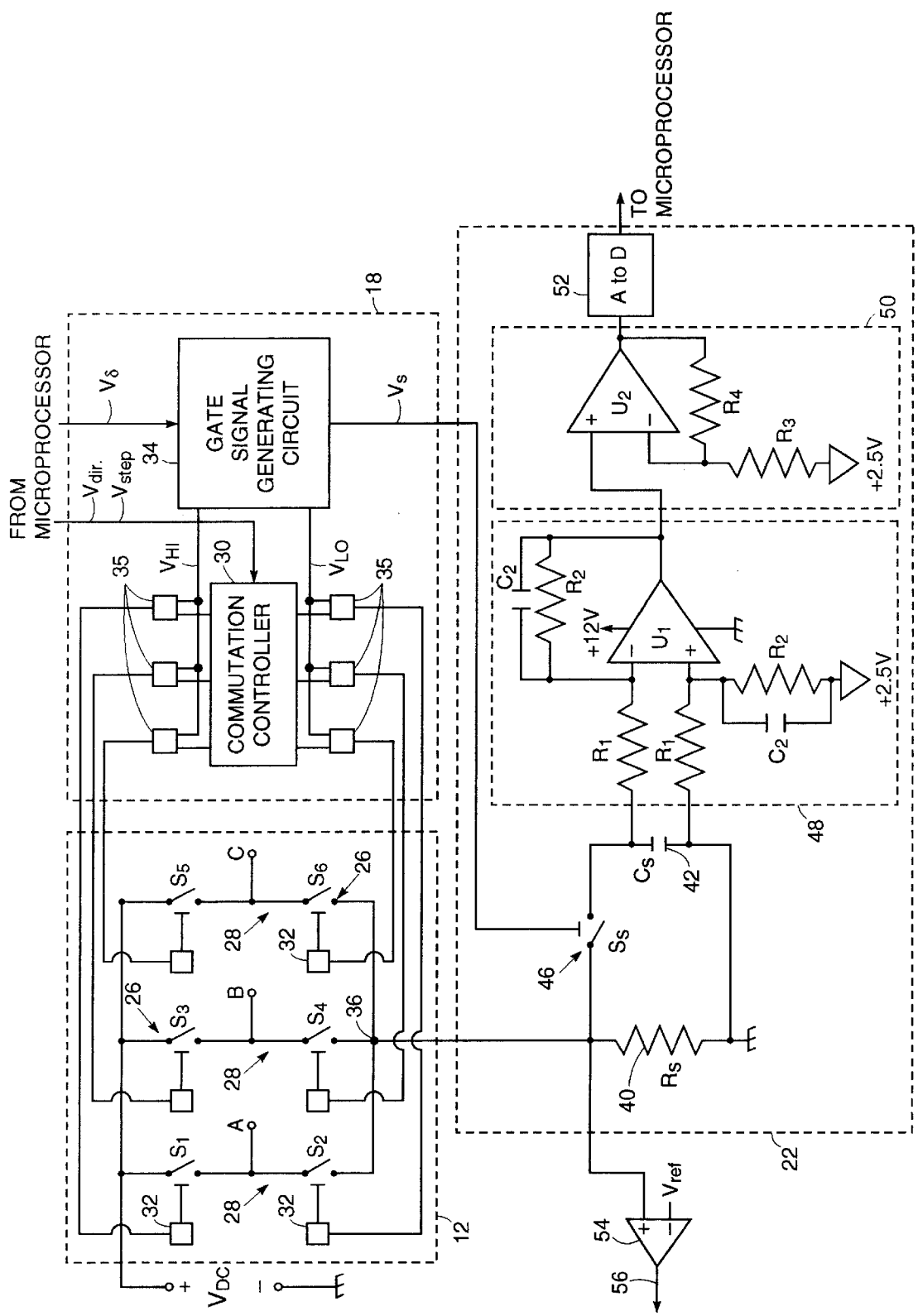
FIG. 2 is a circuit diagram illustrating various portions of the drive controller, including a power switching matrix, current sensing circuitry, and associated switch control circuitry, in accordance with the preferred embodiment.

FIG. 2 is a more detailed schematic diagram showing the power switching matrix 12, switch control circuitry 18, and current sensing circuitry 22 employed in the motor drive controller 10. The power switching matrix 12 preferably features a three phase bridge topology having six power switches 26, labelled $S_1$–$S_6$, arranged in three parallel legs 28, each leg having two power switches connected in series, with each motor phase A, B or C being connected between a different set of legs at points between the switches of the respective legs. For the purposes of this specification, switches $S_1$, $S_3$, and $S_5$ are referred to as "high side" switches, and switches $S_2$, $S_4$, and $S_6$ are referred to as "low side" switches. Each of the switches is preferably a bidirectional power MOSFET device, capable of conducting current in both directions. Alternatively, other types of power semiconductor devices can be used, such as IGBTs, but, as is well known in the art, such other devices may require shunting diodes (not shown) in order to conduct current in the reverse direction. In any event, the state of each switch 26 is determined by the gate voltage of the device composing the switch.

A commutation controller or decoder 30 is connected to each switch 26 via respective gate drivers 32. Driver 32 produces a voltage signal suitable for driving the gate of its respective power switch device based on logic signals, i.e. TTL voltage level signals, received from controller 30. (A suitable gate driver may be, for instance, the model IR2110 integrated circuit commercially available from International Rectifier of El Segundo, Calif.) The commutation controller or decoder 30 selectively applies control PWM signals $V_{HI}$ and $V_{LO}$ supplied by a gate signal generation circuit 34, as described in greater detail below, to each switch 26 in a predetermined commutation sequence. In the preferred embodiment, the commutation controller or decoder 30 implements a 120°, 3-phase, 6-step commutation sequence, as is well known in the art, which is illustrated in the commutation chart of FIG. 3. However, the invention may use other types of commutation sequences, the particular sequence not being overly important to the invention.

Figure 4:
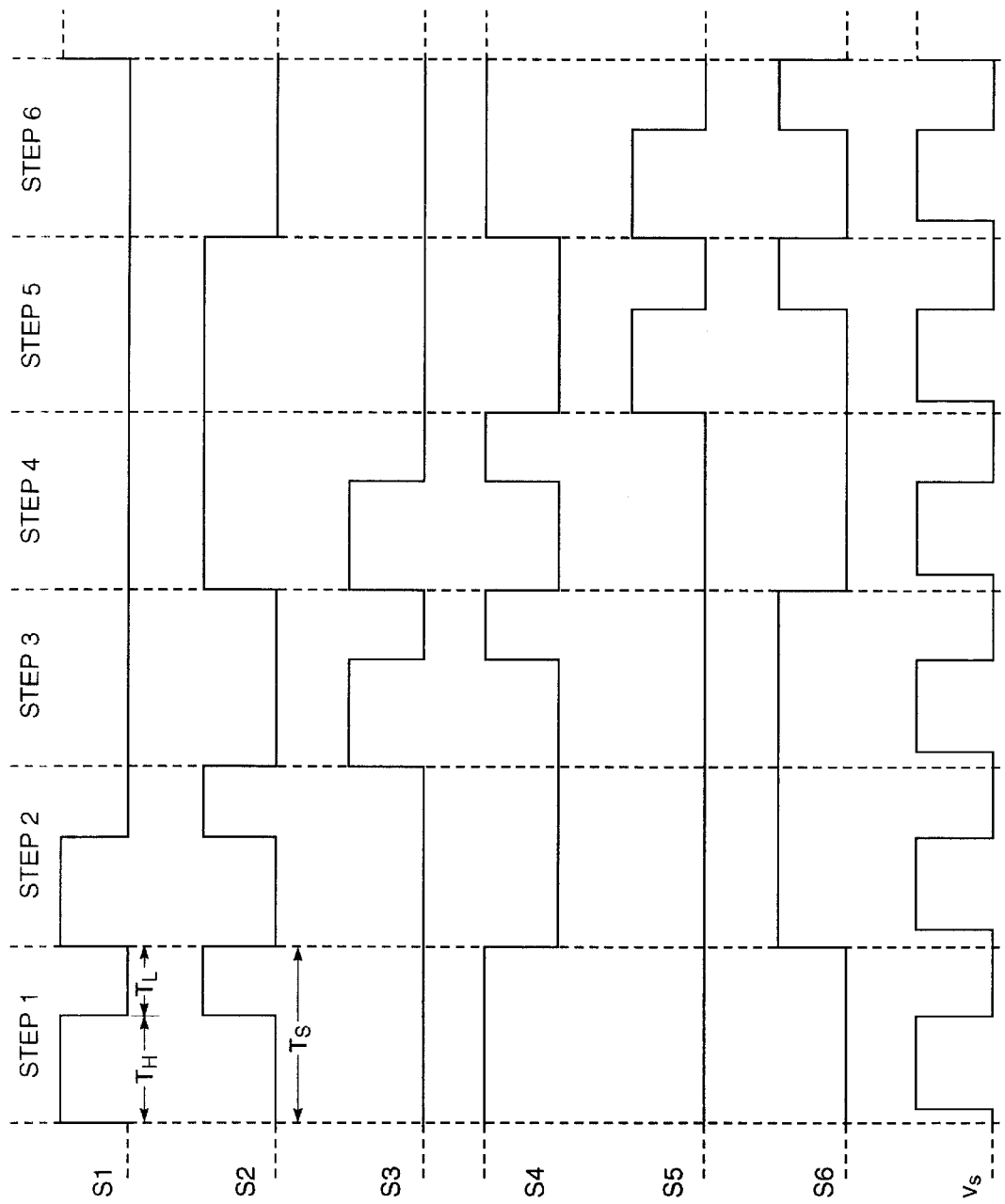
FIG. 4 is a timing diagram illustrating commutation for one electrical rotation of the motor in a forward direction, the commutation being implemented by a unipolar PWM switching scheme.
Figure 5:
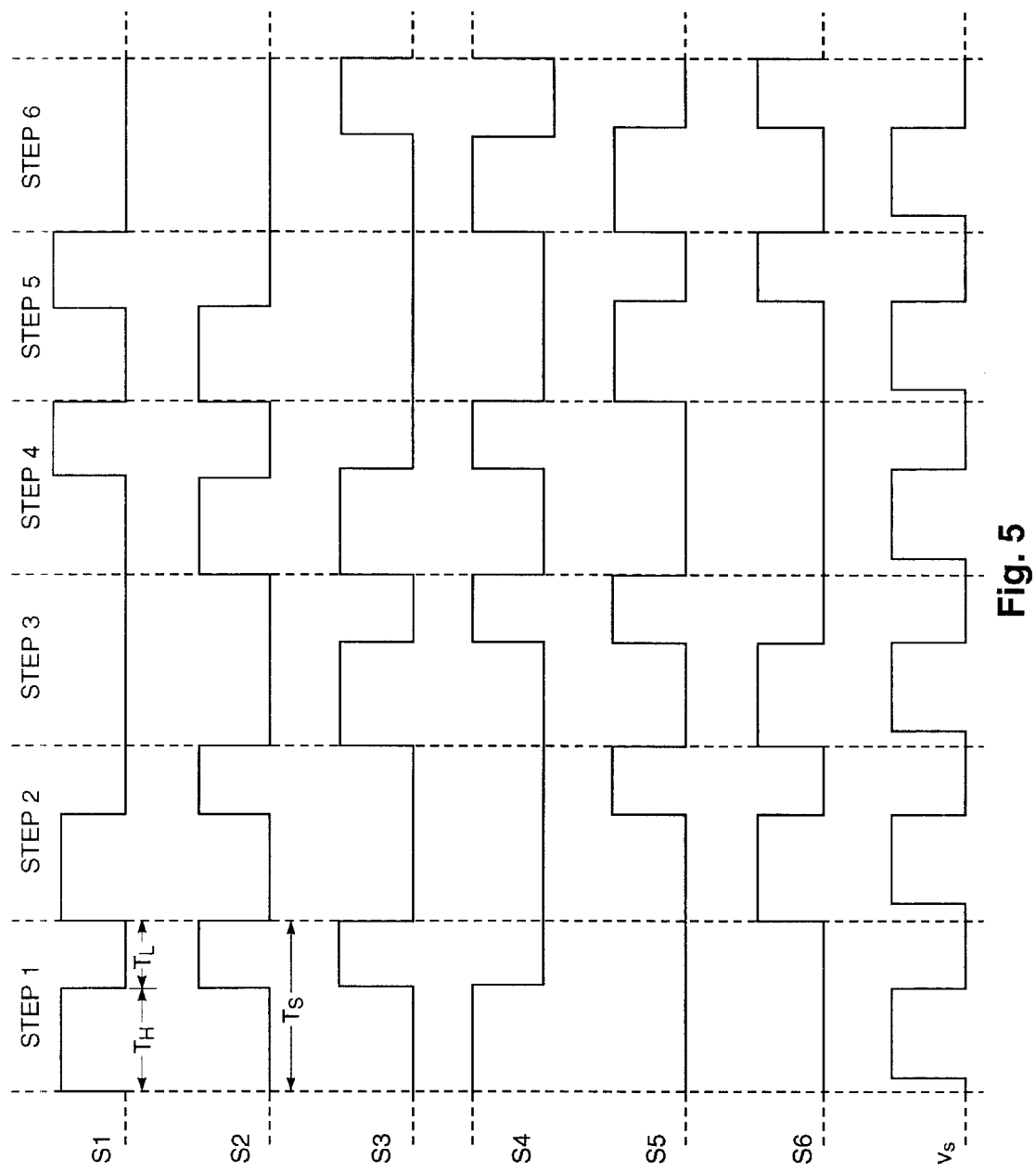
FIG. 5 is a timing diagram illustrating commutation for one electrical rotation of the motor in a forward direction, the commutation being implemented by a bipolar PWM switching scheme.

In practice, the commutation controller or decoder 30 preferably implements the commutation sequence shown in FIG. 3 by using either a unipolar PWM switching scheme or a bipolar PWM switching scheme, as is well known in the art. FIG. 4 presents a timing diagram for the unipolar PWM switching scheme which illustrates commutation for one electrical rotation of motor 16 in a forward direction. FIG. 5 presents a timing diagram for the bipolar PWM switching scheme which illustrates commutation for one electrical rotation of motor 16 in a forward direction. (It will be appreciated by those skilled in the art that while only one PWM switching cycle has been illustrated in FIGS. 4 and 5 for each commutation step for the purposes of clarity, in practice, a commutation step may encompass a plurality of PWM switching cycles, depending upon the speed of the motor's rotor and the PWM frequency.) The commutation controller 30, which may be constructed from a programmable logic device ("PLD") or alternatively in software running on microprocessor 20, embeds the logic necessary to distribute the PWM control signals $V_{HI}$ and $V_{LO}$ via gating circuitry 35 to the switches 26 in accordance with one of the unipolar and bipolar PWM switching schemes. (In practice, the gating circuitry 35 is embedded in the combinatorial logic of the controller 30 but is shown here external thereto for the purposes of illustration.)

It will be noticed that the legs 28 of the three phase bridge are arranged in parallel and connected at their low sides at a point 36. The current sense circuitry 22 is connected to the three phase bridge at this point. The current sense circuitry 22 comprises a current sense resistor 40, a sample and hold capacitor 42, a sampling switch 46, a buffering circuit 48, an amplifying circuit 50, and an analog to digital converter 52.

The current sense resistor 40, also labelled $R_S$, is serially connected to the three phase bridge 12 and power source 14 in order to form an electrical loop. The current sense resistor is preferably a power resistor having a very low resistance, the value of which is dependent on the maximum permissible load current. The sampling capacitor 42, also labelled $C_S$, is connected in parallel with the current sense resistor 40. The sampling switch 46, also labelled $S_S$, is provided for selectively enabling the capacitor 42 to charge to a voltage level corresponding to the amount of current flowing through the current sense resistor 40. In practice the sampling switch 46 can be a TTL voltage level device, such as a logic MOSFET, since relatively low current levels will flow into the sampling capacitor 42. The sampling switch will thus not require a gate driver.

The sampling capacitor 42 is coupled to the buffering circuit 48 which, in the preferred embodiment, comprises a differential amplifier, $U_1$, two resistors, $R_1$, and two parallel RC elements, $R_2 \| C_2$, arranged in the illustrated manner. The buffering circuit 48 is further coupled to the amplifying circuit 50 which, in the preferred embodiment, comprises a differential amplifier, $U_2$, a resistor, $R_3$, and a resistor, $R_4$, arranged in the illustrated manner. The amplifying circuit 50 is further connected to the analog to digital converter 52 which, in turn, is connected to the microprocessor 20.

The sense resistor 40 is also connected at its high side to a comparator 54 which, in turn, is connected to the microprocessor 20. The comparator compares the voltage at point 36 to a reference voltage, $V_{ref}$, indicative of a short circuit condition. The comparator 54 thus provides a short circuit signal 56 to the microprocessor 20.

The circuit arrangement of FIG. 2 is such that, regardless of which motor phase is being driven, the phase current will always pass through the current sense resistor 40. In the preferred 120° mode, 3-phase, 6-step commutation sequence, only one motor phase is being driven at any one time and thus the sampling switch is synchronized with the PWM switching of the power switches 26 in order to measure the phase current. A synchronizing signal, $V_S$, (FIG. 2) is provided by the gate signal generation circuit 34 to actuate the sampling switch. Although the details concerning the gate signal generation circuit are deferred for the moment, the waveform of the $V_S$ signal may be seen in FIGS. 4 and 5 as generated for the unipolar and bipolar switching schemes respectively.

Figure 6A:
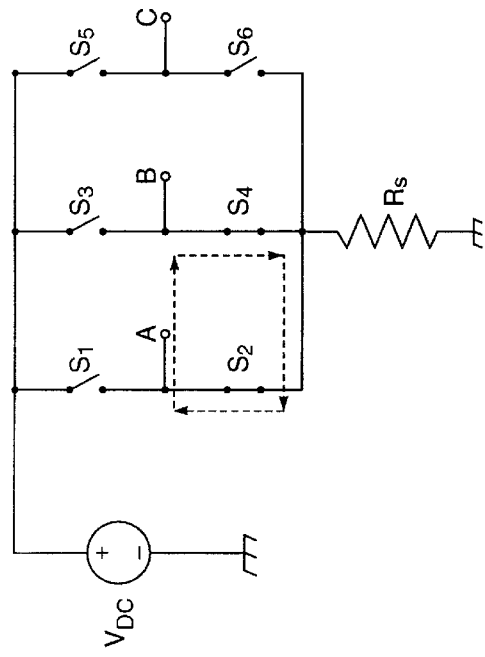
FIG. 6A illustrates current flow through the power switching matrix during an active or driving portion of a PWM cycle in a particular step of the unipolar PWM switching scheme shown in FIG. 4.

The operation of the drive controller 10 is now discussed with respect to the unipolar PWM switching scheme. As shown in FIG. 4, one of the low side switches is switched on for the duration of a commutation step while high and low side switches on one of the other legs of the switching matrix are toggled to enable current flow through the bridge when a given motor phase is being actively supplied with power and when it is not (i.e. when the load represented by the motor is in a "freewheeling"mode). For example, FIG. 6A shows the current flow through the power switching matrix 12 during an active or driving portion, $T_H$, of the switching cycle in Step 1 of the unipolar PWM commutation scheme (see "Step 1" in FIG. 4). As shown in FIG. 6A, during time period $T_H$, switch $S_1$, and switch $S_4$ are on or conducting and the other switches are off or open. Current thus flows through the high side switch $S_1$, through phase A (i.e. across the load connected from A to B) and then to ground through low side switch $S_4$ and the current sense resistor $R_S$. During time period $T_H$, the motor is thus actively driven.

Figure 6B:
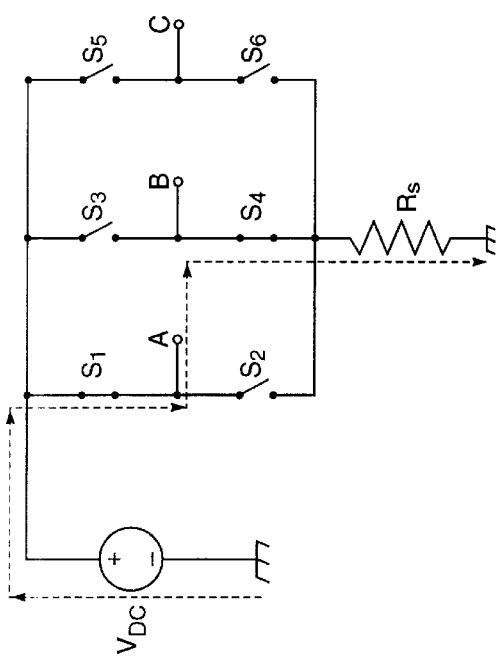
FIG. 6B illustrates current flow through the power switching matrix during an inactive or freewheeling portion of the PWM cycle in the same step of the unipolar PWM switching scheme shown in FIG. 6A.

FIG. 6B shows the current flow through the power switching matrix 12 during an inactive or freewheeling portion, $T_L$, of the switching cycle in Step 1 of the unipolar PWM commutation scheme (see "Step 1" in FIG. 4). As shown in FIG. 6B, during time period $T_L$, low side switch $S_4$ remains on or conducting, high side switch $S_1$ is opened, and low side switch $S_2$ is opened. No changes are made to the other switches. Due to the inductive nature of the load, a circulating or freewheeling current flows through phase A and the low side switches in the illustrated manner, but not through the current sense resistor $R_S$.

Figure 7A:
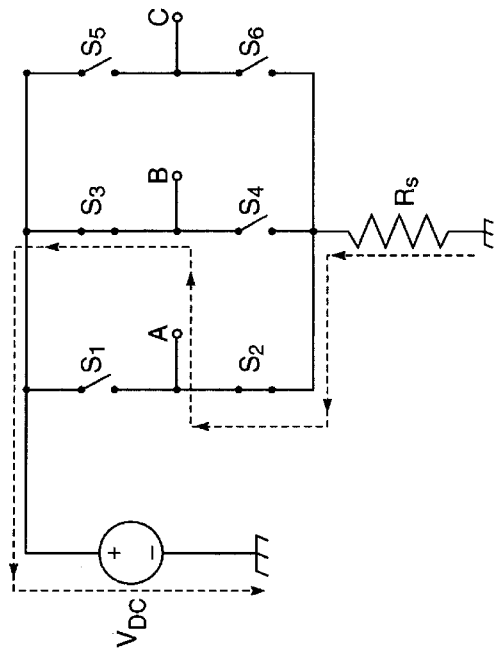
FIG. 7A illustrates current flow through the power switching matrix during an active or driving portion of a PWM cycle in a particular step of the bipolar PWM switching scheme shown in FIG. 5.
Figure 7B:
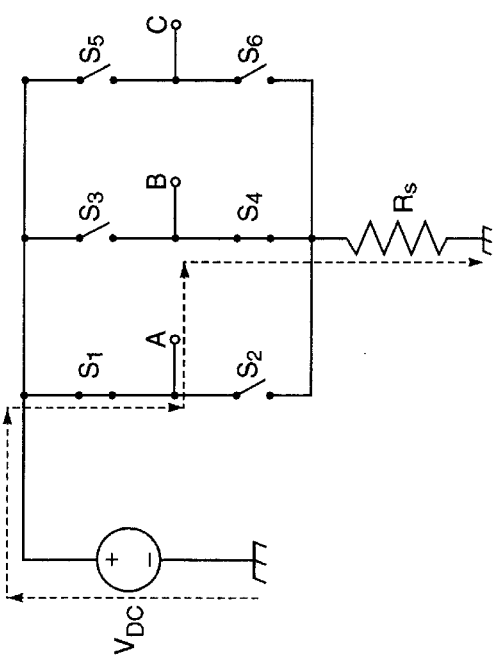
FIG. 7B illustrates current flow through the power switching matrix during an inactive or freewheeling portion of the PWM cycle in same the step of the bipolar PWM switching scheme shown in FIG. 7A.

FIGS. 5, 7A and 7B illustrate the corresponding situation for the bipolar switching scheme. As shown in FIG. 5, the state of the switches on a particular set of legs are complemented during any given commutation step in order to allow current flow when the motor is being actively driven and when it is in the freewheeling condition. For example, FIG. 7A shows current flow through the power switching matrix 12 during the active or driving portion, $T_H$, of the switching cycle in Step 1 of the bipolar PWM commutation scheme (see "Step 1" in FIG. 5). As shown in FIG. 7A, during time period $T_H$, current flows from the power supply through the high side switch $S_1$, phase A, and low side switch $S_4$. Switches $S_2$ and $S_3$ are off.

FIG. 7B shows current flow through the power switching matrix 12 during the inactive or freewheeling portion, $T_L$, of the switching cycle in Step 1 of the bipolar PWM commutation scheme. As shown in FIG. 7B, during time period $T_L$, the state of switches $S_1$, $S_2$, $S_3$ and $S_4$ are complemented and the circulating or freewheeling current of the load flows back into the power supply along the illustrated path.

It will thus be seen that with either type of switching scheme, in one portion of the PWM switching cycle the load is being actively driven and in another portion of the PWM switching cycle it is not. As shown in FIGS. 4 and 5 by signal $V_S$, the sampling switch 46 is activated during the portion of the PWM switching cycle when the motor 16 is being actively driven and current flows through the sense resistor 40.

Referring to FIG. 2, when the sampling switch is activated, the sampling capacitor 42 is charged to a voltage corresponding to the phase current. The buffering circuit 48, having a differential input, will reject common mode noise across the sense resistor 40. This noise may be significant due to the frequent, high voltage switching activity of the switching matrix 12. The buffering circuit 48 also provides a level shifting function wherein, in the illustrated embodiment, the conditions of (a) maximum negative current ($-I_{max}$), (b) zero current, and (c) maximum positive current ($+I_{max}$) through the sense resistor 40 are respectively represented by 0,2.5 and 5 volts at the output of the buffering circuit 48. Advantageously, the common mode voltage at the input of the differential amplifier $U_2$ extends below ground thereby facilitating the single-ended supply feature of this circuit.

The amplifying circuit 50 amplifies the signal at the output of the buffering circuit 48 by a factor of $1+R_4/R_3$. The amplified signal is used by the analog to digital converter 52 to produce a digital signal representative of the phase current or motor load current for use by the microprocessor 20.

Figure 8:
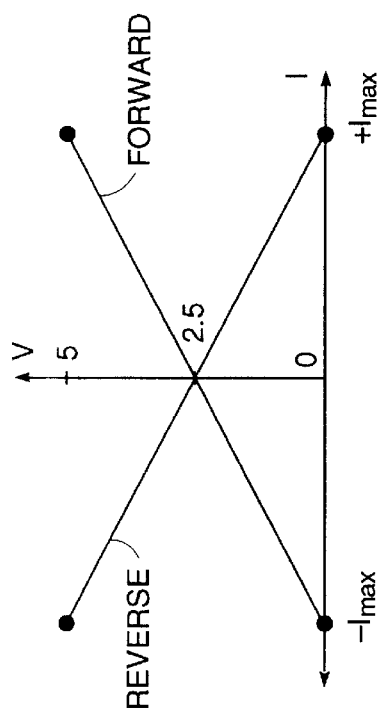
FIG. 8 is a graph illustrating current sense transfer functions provided by the current sensing circuitry for both unipolar and bipolar PWM switching schemes.

FIG. 8 illustrates transfer functions provided at the output of the buffering circuit 48. These transfer functions are applicable for both the unipolar and bipolar PWM switching schemes. It will be noted that the transfer functions with respect to the forward and reverse directions of the motor are the complements of one another. As the microprocessor 20 provides a direction signal, $V_{DIR}$, as well as commutation step signals $V_{STEP}$, (FIG. 2) to the commutation controller 30, the microprocessor 20 thus keeps track of whether the motor 16 is being driven in the forward or reverse direction and can use this information to determine the sign or sense of the sampled current.

Figure 10:
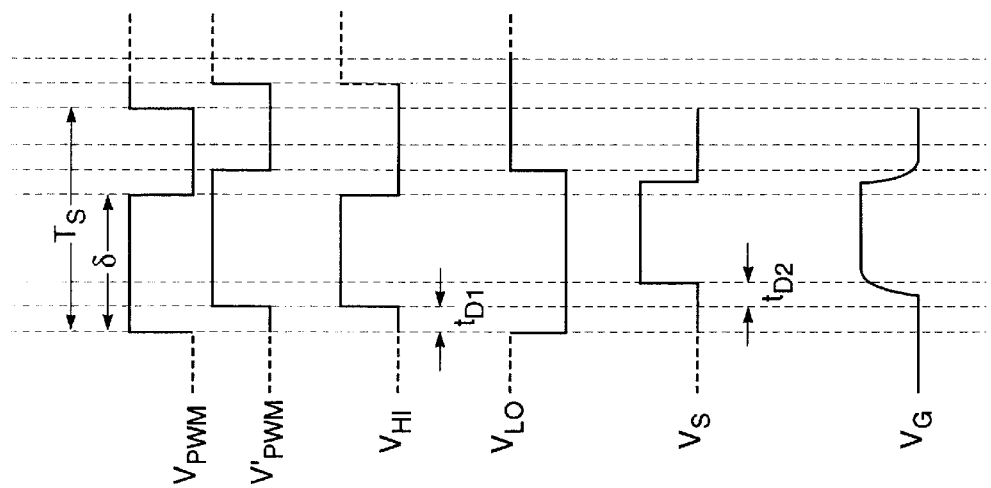
FIG. 10 is a timing diagram illustrating various waveforms generated by the gate signal generation circuit of FIG. 9.
Figure 9:
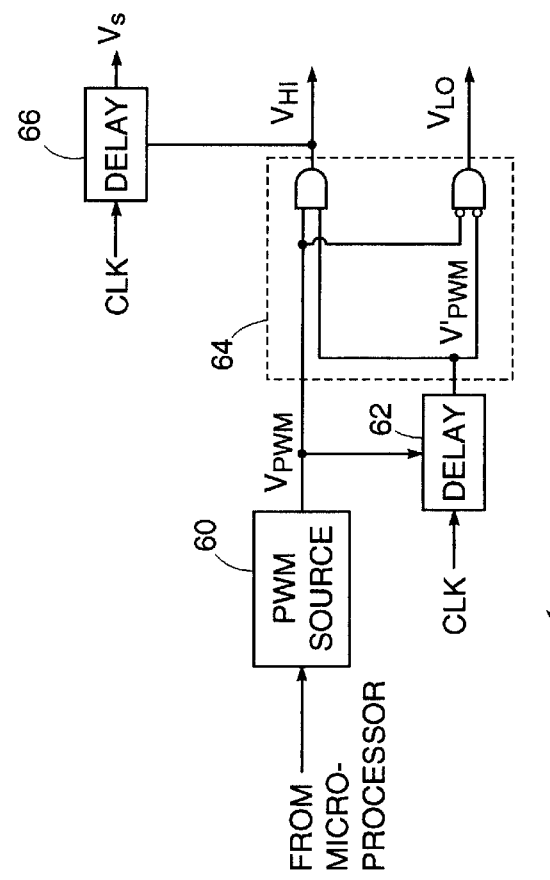
FIG. 9 is a detailed circuit diagram of a portion of the switch control circuitry (shown in FIG. 2), namely a gate signal generation circuit.

FIG. 9 shows the gate signal generation circuit 34 in greater detail, and FIG. 10 illustrates various waveforms generated by circuit 34. Referring to these figures, the microprocessor 20 commands a PWM signal source 60 to generate a master PWM signal, $V_{PWM}$ having a specified frequency and duty cycle $\delta$ (see FIG. 10). These values are determined by the particular servo control loop used to control the motor. A delay circuit 62, such as composed of a linear series of interconnected flip flops triggered by a common clock, produces a delayed PWM signal, $V'_{PWM}$. The $V_{PWM}$ and $V'_{PWM}$ signals are processed by logic circuitry 64 in the illustrated manner to produce the PWM control signals $V_{HI}$ and $V_{LO}$, which are shown in FIG. 10, and which are selectively routed or distributed by the commutation controller 30 to the power switches 26 as described above and shown in FIG. 2. It will be noted that a dead time, $t_{D1}$, is inserted between $V_{HI}$ and $V_{LO}$ in order to accommodate the finite switching times of the power switches. The $V_{HI}$ signal is further delayed by a delay circuit 66 to produce the synchronization signal $V_S$ used to control the sampling switch 46. It will be noted that $V_S$ is further delayed by a time, $t_{D2}$, sufficient to allow the high side power switches to fully turn on due to propagation delays and turn on delays associated with gate drivers 32, as indicated by $V_G$ in FIG. 10. In this manner, the gate signal generation circuit 34 includes a means for synchronizing the sampling switch 46.

In the preferred embodiment, the buffering circuit 48 presents a very high resistance to the capacitor 42, and thus the sampling capacitor 42 will discharge very little during the low phase of the PWM control signal $V_{HI}$. As the motor load current changes relatively slowly from cycle to cycle, the sampling capacitor will thus require relatively little time to fully charge during the portion of the switching cycle where the load is being actively driven. Thus, the $V_S$ signal may also be applied to trigger the analog to digital converter 52, or, depending on the speed of the converter, the $V_S$ signal may be delayed by a further delay circuit (not shown) and applied to the digital to analog converter 52.

To ensure proper current sensing, one of the constraints in the foregoing circuitry is that a non-zero PWM signal must be applied to the motor 16. Specifically, there is a minimum duty cycle, $\delta_{min}$, which is required to ensure that the sampling capacitor 42 has enough time to be adequately charged, since the sampling switch, $S_S$, has a finite on-resistance. The relationship is:

$$\delta_{min} = \frac{T_{H_{min}}}{T_S} \approx \frac{C_S * R_{S_S-ON}}{T_S}$$

where $T_S$ is the switching cycle time (i.e. switching period), $C_S$ is the value of the sample capacitor and $R_{S_S-ON}$ is the value of the on-resistance of $S_S$. This constraint has not been found to be a significant impediment in practice.

Also, in order to ensure that the sampled current is an accurate representation of the load current, it is important that the ripple current of the motor, i.e. the change in current levels due to the charging and discharging of the inductive load represented by the motor, be minimal. This can be accomplished by having the switching period, $T_S$, small compared to the time constant of the inductive load; i.e. $T_S << L_m/R_m$, where $L_m$ is the equivalent load inductance and $R_m$ is the equivalent load resistance (FIG. 1). Of course, where the current sensing apparatus of the invention is applied to a capacitive load the relationship will be $T_S << R_L C_L$ where $R_L$ is the equivalent load resistance and $C_L$ is the equivalent load capacitance. If the load had no reactive component, these constraints are not applicable.

In foregoing manner, the invention provides a versatile and inexpensive solution to sensing current using only one resistive shunt and minimal supporting synchronization circuitry. The aforesaid isolation requirement is satisfied by the invention since the differential amplifier $U_1$ employed in the buffering circuit 48 typically provides sufficient common mode noise rejection. The resistive shunt also provides the fastest possible sensing option for determining a short circuit condition.

The preferred embodiment may be varied in a number of ways. For example, while the current sense resistor, $R_S$, has been shown to be disposed on the low side of three phase bridge in a clockwise loop comprising the power source, the three phase bridge and the current sense resistor, it will be appreciated that the current sense resistor may be disposed on the high side of the bridge in a clockwise loop comprising the power source, the sense resistor and the bridge. In this alternative embodiment, the remaining current sensing circuitry will remain substantially similar although different component values and supply voltages may be necessary. Nevertheless, the sampling switch could still be triggered by $V_S$, corresponding to a delayed version of the $V_{HI}$ signal produced by the gate signal generation circuit 34.

In addition, it will be appreciated by those skilled in the art that the preferred embodiment may be extended to handle a variety of alternative types of commutation modes and sequences including, for instance, a 3 phase, 12-step commutation sequence. In some of these schemes, such as the 12-step sequence, more than one phase current may flow through the motor during any given commutation step, but the invention will still sense the motor load current, which is the superposition of the various phase currents. If desired, the phase current may be computed by microprocessor 20 from mathematical relationships relating motor load current to phase current as well known in the art.

Also, while the preferred embodiment has shown a microprocessor being used for providing certain commutation control, it will be understood that the microprocessor may be replaced by a variety of analog loop compensator circuits in order to provide feedback information to the commutation controller or decoder 10. Alternatively, the commutation controller or decoder 10 could itself be implemented by software running on the microprocessor.

The invention has been described with a certain particularity for the purposes of illustration. Those skilled in the art will appreciate that numerous other modifications and variations may be made to the preferred embodiment without departing from the spirit and scope of the invention as described in the claims below.

I claim:

1. In a power controller which powers a multi-phase load from a power supply by employing (a) a power switching matrix connected to the load, and (b) switching control means for generating a switching cycle and a commutation sequence in order to control the power switching matrix, apparatus in combination with the switching control means for sensing current flowing through the load, the current sensing apparatus comprising:
    a resistive element for sensing current connected in series between the power supply and the power switching matrix such that the power supply, switching matrix and current resistive element form an electrical loop;
    a capacitive element connected in parallel with the resistive element,
    an output which provides an output signal representative of the sampled current, said output signal being provided at the capacitive element;
    a sampling switch having a control input, installed between the capacitive element and resistive element in order to selectively charge the capacitive element, the sampling switch having an on-resistance, the capacitive element and sampling switch being selected such that $$T_{H_{min}} \approx C_S * R_{S_S-ON}$$

where $T_{H_{min}}$ is a minimum permissible time period for the portion of the switching cycle wherein the load is being actively driven, $C_S$ is the capacitance provided by the capacitive element, and $R_{S_S-ON}$ is the on-resistance of the sampling switch; and a sampling switch actuation circuit, operatively connected to the control input, for activating the sampling switch for a time period corresponding to a portion of the switching cycle in each commutation step wherein the power switching matrix is configured to enable current flowing through the load to flow through the resistive element.

2. The current sensing apparatus according to claim 1, wherein the switching control means produces pulse width modulated ("PWM") switching control signals for controlling the power switching matrix and the commutation thereof is implemented using either a unipolar switching scheme or a bipolar switching scheme, and wherein the sampling period is a portion of the switching cycle in each commutation step wherein the power switching matrix is configured to actively drive the load.

3. The current sensing apparatus according to claim 2, wherein the sampling switch actuation circuit comprises a delay circuit for generating a delayed version of a given PWM switching control signal, the delayed signal being operatively connected to the control input of the sampling switch for the control thereof, the delay provided by the delay circuit being sufficient to ensure that the power switching matrix has reached a relatively stable state.

4. The current sensing apparatus according to claim 3, further including a comparator connected to (a) a reference voltage and (b) to the, resistive element in order to signal a short circuit condition.

5. The current sensing apparatus according to claim 3, wherein the load is an inductive load and $$T_S << \frac{L_m}{R_m}$$

where $T_S$ is the switching period of the power switching matrix for any given commutation step, $L_m$ is the equivalent inductance presented by the load, and $R_m$ is an equivalent resistance presented by the load.

6. The current sensing apparatus according to claim 2, further comprising:
    a buffering and level shifting circuit operatively connected to the capacitive element; and
    an amplifying circuit operatively connected to the buffering and level shifting circuit, wherein the output signal is provided at the output of the amplifying circuit.

7. The current sensing apparatus according to claim 6, wherein the switching control means comprises (a) means for generating a master PWM signal having a specified duty cycle and frequency, and (b) means for generating a high-side PWM control signal which is a delayed and partially truncated version of the master PWM signal in order to accommodate a finite switching time of the switching matrix; and wherein the sampling switch actuation circuit comprises a delay circuit for producing a delayed version of the high-side PWM control signal, the delayed signal being operatively connected to the control input of the sampling switch for the control thereof, the delay provided by the delay circuit being sufficient to ensure that the power switching matrix has reached a relatively stable state.

8. The current sensing apparatus according to claim 6, further including a comparator connected to (a) a reference voltage and (b) to the resistive element in order to signal a short circuit condition.

9. The current sensing apparatus according to claim 6, wherein the load is an inductive load and $$T_S \ll \frac{L_m}{R_m}$$

where $T_S$ is the switching period of the power switching matrix for any given commutation step, $L_m$ is the equivalent inductance presented by the load, and $R_m$ is an equivalent resistance presented by the load.

10. A multi-phase motor controller, comprising:

a power switching matrix for selectively powering a multi-phase motor from a power supply;

switching control circuitry, including a commutation controller, operatively connected to the power switching matrix for generating a switching cycle in order to control the power switching matrix and providing an m-phase, n-step commutation sequence;

a resistive element for sensing current connected in series between the power supply and the power switching matrix such that the power supply, switching matrix and resistive element form an electrical loop;

a capacitive element connected in parallel with the resistive element;

an output which provides an output signal representative of the sampled current, said signal output being provided across the capacitive element;

a sampling switch, having a control input, installed between the capacitive element and resistive element in order to selectively charge the capacitive element, the sampling switch having an on-resistance, the capacitive element and sampling switch being selected such that $$T_{H_{min}} \approx C_S * R_{S_s\text{-}ON}$$

where $T_{Hmin}$ is a minimum permissible time period for the portion of the switching cycle wherein the load is being actively driven, $C_S$ is the capacitance provided by the capacitive element, and $R_{Ss\text{-}ON}$ is the on-resistance of the sampling switch;

a sampling switch actuation circuit, operatively connected to the control input, for activating the sampling switch for a time period corresponding to a portion of the switching cycle in each commutation step wherein the power switching matrix is configured to enable current flowing through the load to flow through the resistive element.

11. The motor controller according to claim 10, wherein the switching matrix comprises a plurality of legs connected in parallel, each leg having two switches connected in series with a phase output being available at a point between the two switches of the leg.

12. The motor controller according to claim 11, wherein the commutation controller implements one of a unipolar PWM switching scheme and a bipolar PWM switching scheme.

13. The motor controller according to claim 12, wherein the sampling switch actuation circuit comprises a delay circuit for generating a delayed version of a PWM switch control signal produced by the switching control circuitry, said delayed signal being operatively connected to the control input of the sampling switch for the control thereof, the delay provided by the delay circuit being sufficient to ensure that the switching matrix has reached a relatively stable state.

14. The motor controller according to claim 13, further including a comparator connected to (a) a reference voltage and (b) to the resistive element, in order to signal a short circuit condition.

15. The motor controller according to claim 13, wherein $$T_S \ll \frac{L_m}{R_m}$$

where $T_S$ is the switching period of the switching matrix for any given commutation step, $L_m$ is the equivalent inductance presented by the motor, and $R_m$ is an equivalent resistance presented by the motor.

16. The motor controller according to claim 12, further comprising:

a buffering and level shifting circuit operatively connected to the capacitive element; and an amplifying circuit operatively connected to the buffering and level shifting circuit, wherein said output signal is provided at the output of the amplifying circuit.

17. The motor controller according to claim 16, wherein the switch control circuitry circuit comprises (a) a means for generating a master PWM signal having a specified frequency and duty cycle, and (b) a means for generating a high side PWM control signal which is a delayed and partially truncated version of the master PWM signal in order to accommodate a finite switching time of the switching matrix; and wherein the sampling switch actuation circuit comprises a delay circuit for producing a delayed version of the high side PWM control signal, the delayed signal being operatively connected to the control input of the sampling switch for the control thereof, the delay provided by the delay circuit being sufficient to enable the switching matrix to reach a relatively stable state.

18. The motor controller according to claim 16, further including a comparator connected to (a) a reference voltage and (b) to the resistive element or, in order to signal a short circuit condition.

19. The motor controller according to claim 16, wherein $$T_S \ll \frac{L_m}{R_m}$$

where $T_S$ is the switching period of the switching matrix for any given commutation step, $L_m$ is the equivalent inductance presented by the motor, and $R_m$ is an equivalent resistance presented by the motor.

20. A method for sensing current supplied to a multi-phase load from a power supply by apparatus which employs a power switching matrix connected to the load and commutation control means for providing switching control signals, having a switching cycle, to the power switching matrix, the method comprising:

connecting a resistive element for sensing current in series between the power supply and the power switching matrix such that the power supply, switching matrix and resistive element form an electrical loop;

connecting a capacitive element in parallel with the resistive element;

installing a sampling switch between the capacitive element and resistive element in order to selectively charge the capacitive element, the sampling switch having an on-resistance, the capacitive element and sampling switch being selected such that $$T_{H_{min}} \approx C_S * R_{S_s\text{-}ON}$$

where $T_{Hmin}$ is a minimum permissible time period for the portion of the switching cycle wherein the load is being actively driven, $C_S$ is the capacitance provided by the capacitive element, and $R_{Ss\text{-}ON}$ is the on-resistance of the sampling switch;

activating the sampling switch for a time period corresponding to a portion of the switching cycle in each commutation step wherein the power switching matrix is configured to enable current flowing through the load to flow through the resistive element; and reading the voltage or current of the capacitive element during said time period.

21. The method according to claim 20 wherein the commutation controller implements unipolar switching scheme and generates pulse width modulated ("PWM") switching control signals, and wherein the sampling period is a portion of the switching cycle in each commutation step wherein the power switching matrix is configured to actively drive the load.

22. The method according to claim 20 wherein the commutation controller implements a bipolar switching scheme and generates pulse width modulated ("PWM") switching control signals, and wherein the sampling period is a portion of the switching cycle in each commutation step wherein the power switching matrix is configured to actively drive the load.

* * * * *